UNITED STATES PATENT OFFICE.

JOHN P. IHART, OF NEW YORK, N. Y.

LACQUER OR VARNISH.

No. 811,563.     Specification of Letters Patent.     Patented Feb. 6, 1906.

Application filed September 22, 1905. Serial No. 279,687.

*To all whom it may concern:*

Be it known that I, JOHN P. IHART, a citizen of the United States, residing in the city, county, and State of New York, have invented a new and useful Improvement in Lacquers or Varnishes and Their Production, of which the following is a specification.

My invention relates to the production of lacquers or varnishes; and the object of my invention has been to discover a use for the oils produced from the so-called "water-gas tar," or, as it should be more properly called, "oil-gas tar," a waste product in the manufacture of oil-gas or illuminating-gas enriched with oil-gas.

The lacquers or varnishes now in general use are obtained by dissolving various gums or resins in a suitable solvent adapted to each, and their manufacture, while requiring great skill and care, involves a very slow process and requires elaborate heating and boiling arrangements.

In producing my new lacquers or varnishes I distil the oil-gas tar in the ordinary way and collect those oils or distillates which pass over below 200° centigrade or just a little before the naphthalene begins to pass. I then take the distillate and separate it by redistillation into the various fractions, the lighter distillates furnishing the limpid and quicker-drying lacquers or varnishes and the heavier distillates furnishing the viscous and slower-drying lacquers or varnishes. I then add to these distillates, according to whichever one is desired, from one to three per cent. of the chlorids of tin, bismuth, antimony, or aluminium, or admixtures of these chlorids. The mixture of oil and metallic chlorid or chlorids is then stirred or agitated by any suitable means until the reaction is complete. When the oil and chlorid are first mixed and stirred, the mixture becomes heated. As more chlorid is added the mixture becomes hotter and becomes black in color. After an interval, during which its highest temperature is reached, the mixture cools gradually, showing the completion of the reaction. I cannot explain the nature of this reaction chemically; but the result will be apparent to the operator. This will take place in from one-half an hour to two hours, according to the temperature to which the treated oil rises. The treatment will become completed sooner in the case of the lighter oils or distillates, as they become very hot, due to the chemical reaction taking place more vigorously, while the reaction is slower with the heavier oils or distillates, which do not heat up so readily and require more time therefore for the reaction to become complete. In the case of the heavier oils the reaction can be hastened by the application of a gentle heat. The lacquers or varnishes thus formed when the reaction with the metallic chlorids is complete are then filtered and are ready for use, forming clear liquids varying in colors from red in the lighter distillates to bright yellow in the heavier distillates and drying so as to leave a film in from five to fifteen minutes for the lighter distillates and in from one-half an hour to two hours in the case of the heavier distillates.

The chlorids of tin and bismuth act very slowly. The chlorids of antimony, especially antimonious chlorid, act very well; but they are easily decomposed by water, which may be present in the oil. Aluminium chlorid, especially the anhydrous chlorid, acts very vigorously, and as it is cheap I prefer to use it. The residuum from the redistillation of the composite distillates from the oil-gas tar usually contains naphthalene, which is deposited when the oil is cooled. I can use this oil also (after separating out the naphthalene) by the same treatment with the chlorid or chlorids; but it makes a lacquer or varnish which is much darker and dries more slowly. So, also, I can use the drip or condensation from the purified oil-gas or illuminating-gas enriched with oil-gas found in the holders of gas-works or in the street-mains instead of the oil-gas tar and by the same treatment with the metallic chlorids named produce my new lacquers or varnishes.

It will of course be understood that instead of distilling the distillate coming over below 200° centigrade I can use the entire distillate and mix therewith the chlorids of the metals named with agitation and produce a varnish therefrom.

Having thus described my invention, what I claim is—

1. The new lacquer or varnish consisting of a distillate from oil-gas tar passing over below 200° centigrade in admixture with one of the group of chlorids consisting of chlorid of tin, chlorid of bismuth, chlorid of antimony, and chlorid of aluminium, substantially as described.

2. The new lacquer or varnish consisting of a distillate of oil-gas tar passing over below 200° centigrade admixed with aluminium chlorid, substantially as described.

3. The new lacquer or varnish consisting of a fraction of the distillate from oil-gas tar passing over below 200° centigrade in admixture with one of the group of chlorids consisting of chlorid of tin, chlorid of bismuth, chlorid of antimony, and chlorid of aluminium, substantially as described.

4. The new lacquer or varnish consisting of a fraction of the distillate of oil-gas tar passing over below 200° in admixture with aluminium chlorid, substantially as described.

JOHN P. IHART.

Witnesses:
OTTO J. CHRIST,
JOHN JAY CULLEN.